Nov. 16, 1926.　　　　　　　　　　　　　　　　　1,606,830
M. FINKEL

INTERMITTENT MOVEMENT PIN AND SPROCKET REMOVING PRESS

Filed June 12, 1926

Morris Finkel
INVENTOR

BY Victor J. Evans
ATTORNEY

WITNESS

Patented Nov. 16, 1926.

1,606,830

UNITED STATES PATENT OFFICE.

MORRIS FINKEL, OF FREELAND, PENNSYLVANIA.

INTERMITTENT-MOVEMENT PIN AND SPROCKET REMOVING PRESS.

Application filed June 12, 1926. Serial No. 115,594.

My present invention has reference to a tool that is especially designed for removing the pins that secure the sprocket to the spindle of that part of a moving picture mechanism known as the intermittent movement, and for likewise drawing the sprocket from off of the spindle, whereby worn or injured sprockets may be removed and replaced in an easy and expeditious manner, a task which, incident to the close proximity of the spindle and the sprocket thereon with respect to the frame of the machine, could not heretofore be successfully accomplished without liability of distorting or bending the spindle which affects the steadiness of a projected picture when a new sprocket is arranged thereon.

To the attainment of the foregoing, the improvement resides in the construction, combination and operative association of parts, a satisfactory embodiment of which is illustrated by the drawings which accompany and form part of this application.

Figure 1:
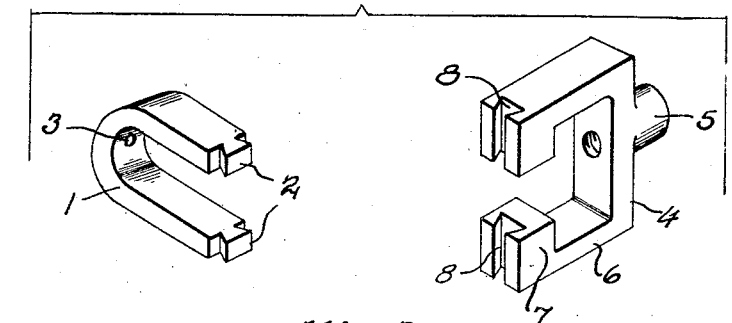
Figure 1 is a perspective view of the main elements constituting the improvement.

Before entering a detail description of my invention it will be well to make reference to the manner in which the sprocket wheels for the intermittent moving of the moving picture machines are now removed from the supporting spindles therefor. The pins which connect the hub of the sprocket to the spindle are tapered and both the spindle and sprocket are disposed in close proximity to the frame of the machine. Obviously should the spindle be subjected to a shock or jar, such as the impulse of force from the blow of a hammer, the spindle is liable to at least slight distortion and should the spindle be distorted to the slightest degree the sprocket thereon will not run true, which, of course, affects the steadiness of the picture which is projected on the screen. Ordinarily these pins are knocked out by the employment of a steel punch which is subjected to the blows of a hammer, such blows, however, being cushioned by the arrangement of a wooden block against one side of the sprocket hub. The cushioning means cannot be properly supported because other parts of the moving picture mechanism prevent the proper application of such means, and the result is that in almost every instance when a worn sprocket is removed from the spindle the spindle becomes distorted and useless, and a complete new intermittent movement must be installed. It is thus to be noted that a worn or injured spindle cannot be trued up and therefore must be discarded, which, as above stated, necessitates the installation of another intermittent movement.

In carrying out my invention I make use of a U-shaped metal member 1 which I will term a shoe. The shoe has its parallel arms, at the ends thereof, formed with dove-tailed lugs 2 and has its rounded portion which connects the arms, centrally formed with an opening 3.

The co-acting member of the improvement comprises a member 4 having a hub 5 that has a threaded opening therethrough, the said opening also extending through the member 4. The member 4 has parallel outstanding arms 6 on the ends thereof which terminate in inwardly extended portions or jaws 7. These jaws on their outer faces are formed with dove-tail grooves 8 to receive therein the dovetail lugs 2 on the shoe. The member 4 may be termed a jaw member.

Figure 2:
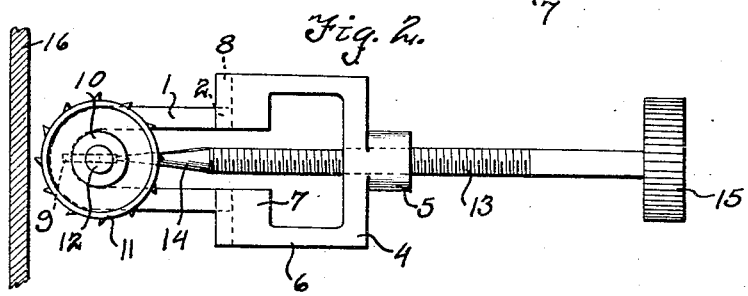
Figure 2 is an elevation showing the manner in which the tapered pins are removed.

In Figure 2 of the drawings I have illustrated a manner in which the wedge pins 9 are forced through the hub 10 of the sprocket 11 and through the spindle 12. By reference to this figure it will be seen that the shoe is connected to the jaw member and that there is threaded through the boss 5 of the jaw member 4 a screw 13 that has one of its ends pointed, as at 14, and its other end provided with a milled head 15. By reference to Figure 2 it will be seen that the frame 16 of the machine is arranged in close proximity to the spindle 12 and to the hub, so that the wooden block previously referred to, cannot successfuly be brought to bear against the hub. However, it will be noted that with my improvement the shoe effectively embraces the hub 10 so that the distortion of the spindle upon the screwing home of the screw to remove the pins will be prevented.

Figure 3:
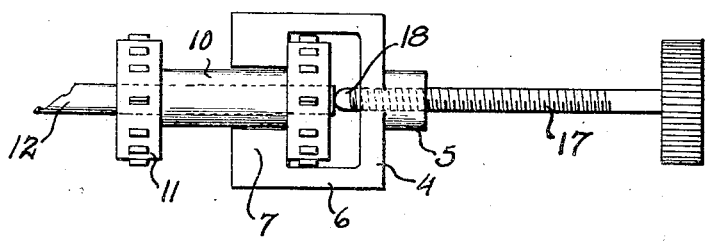
Figure 3 is a view showing the manner in which the sprocket is removed from the spindle.

In Figure 3 of the drawings, I have shown a manner in which the improvement is employed for drawing the sprocket off of the spindle. In this instance the shoe 1 is dispensed with, and the jaws 7 of the member 4 are brought against the inner face of one of the wheels of the sprocket. In this instance the screw 17 preferably has a rounded inner end 18 which contacts with the outer end of the spindle. It will be apparent that by screwing the screw home the sprocket may be readily drawn off of the spindle without liability of injury to said spindle. In this connection it may be stated that the ordinary manner of forcibly removing the sprocket from the spindle also results in the distortion or bending of the spindle in the type of machines to which this invention relates.

In inserting new pins after new sprocket has been placed on the spindle, the pins may be pushed in with the tool in the same manner as the pins are pressed out without using punch and hammer.

Having described the invention, I claim:—

1. A device for the purpose set forth, comprising a substantially U-shaped shoe, and a member having parallel arms that merge into inwardly directed jaws, said U-shaped shoe and said member being provided with means for removably securing the ends of the shoe to the jaws, and a screw threaded through said jaw carrying member.

2. A tool for the purpose set forth, comprising a substantially U-shaped shoe having its ends formed with dove-tailed lugs and its central rounded portion provided with an opening, a member having parallel arms whose outer ends are inwardly directed to provide jaws, said member having a boss thereon provided with a threaded opening which is arranged centrally with respect to the jaws, a screw threaded in said opening, and said jaws having dove-tailed slots to receive therein the dove tailed lugs on the shoe.

In testimony whereof I affix my signature.

MORRIS FINKEL.